(12) United States Patent     (10) Patent No.:     US 12,630,459 B2

Arndt et al.                      (45) Date of Patent:         May 19, 2026

---

(54) CLEANING STEP TO REMOVE METALS OR METAL OXIDES FROM POROUS GLASS BODY

(71) Applicant: CORNING INCORPORATED, Corning, NY (US)

(72) Inventors: Steven Treavis Arndt, Mint Hill, NC (US); Raymond David Groh, Wilmington, NC (US); Ashley Anne Holman, Leland, NC (US); Spencer Thomas Kingsbury, Pittsburgh, PA (US)

(73) Assignee: CORNING INCORPORATED, Corning, NY (US)

( * ) Notice: Subject to any disclaimer, the term of this patent is extended or adjusted under 35 U.S.C. 154(b) by 93 days.

(21) Appl. No.: 18/637,553

(22) Filed: Apr. 17, 2024

(65) Prior Publication Data

US 2024/0360024 A1      Oct. 31, 2024

Related U.S. Application Data

(60) Provisional application No. 63/462,704, filed on Apr. 28, 2023.

(51) Int. Cl.
*C03B 37/018*          (2006.01)
*C03B 37/03*           (2006.01)

(52) U.S. Cl.
CPC .. *C03B 37/01846* (2013.01); *C03B 37/01853* (2013.01); *C03B 37/032* (2013.01)

(58) Field of Classification Search
None
See application file for complete search history.

(56) References Cited

U.S. PATENT DOCUMENTS

| | | | | |
|---|---|---|---|---|
| 5,609,666 A | * | 3/1997 | Heitmann | C03B 37/01446 65/374.13 |
| 2002/0108404 A1 | * | 8/2002 | Burke | C03B 37/01446 65/422 |

(Continued)

FOREIGN PATENT DOCUMENTS

| | | |
|---|---|---|
| CN | 109133608 A | 1/2019 |
| IN | 254514 B | 11/2007 |

OTHER PUBLICATIONS

JP 2008050204 machine translation, Okazaki Iwao et al., Manufacturing process of quartz glass, Mar. 2008 (Year: 2008).*

(Continued)

*Primary Examiner* — Queenie S Dehghan
(74) *Attorney, Agent, or Firm* — Kevin L. Bray

(57)          ABSTRACT

A method of manufacturing including: (a) a first vapor deposition step comprising vapor depositing a first porous glass body of a glass former and a doping constituent onto a substrate; (b) a cleaning step after the first vapor deposition step, the cleaning step comprising exposing the first porous glass body to a cleaning gas at a cleaning temperature for a cleaning period of time, the cleaning gas (i) removing a metal or metal oxide from the first porous glass body, (ii) changing an oxidation state of a metal or metal oxide within the first porous glass body, or (iii) a combination of (i) and (ii); and (c) a second vapor deposition step after the cleaning step, the second vapor deposition step comprising vapor depositing a second porous glass body of the glass former onto the first porous glass body resulting in a porous preform for an optical fiber.

19 Claims, 11 Drawing Sheets

Example 1 and Comparative Example 2

(56) References Cited

U.S. PATENT DOCUMENTS

| 2003/0046960 | A1* | 3/2003 | Dawes ............... G02B 6/03627 |
| | | | 65/391 |
| 2008/0011019 | A1* | 1/2008 | Hayami ............ C03B 37/01446 |
| | | | 65/377 |
| 2009/0272716 | A1 | 11/2009 | Bookbinder et al. |
| 2018/0265395 | A1* | 9/2018 | Cocchini ........... C03B 37/01493 |

OTHER PUBLICATIONS

International Search Report and Written Opinion of the International Searching Authority; PCT/US2024/022959; dated Jul. 5, 2024; 9 pages; European Patent Office.

* cited by examiner

48

55

52

54

CLEANING STEP TO REMOVE METALS OR METAL OXIDES FROM POROUS GLASS BODY

This application claims the benefit of priority under 35 U.S.C § 120 of U.S. Provisional Application Ser. No. 63/462,704 filed on Apr. 28, 2023, the content of which is relied upon and incorporated herein by reference in its entirety.

TECHNICAL FIELD

The present disclosure pertains to the manufacture of optical fiber and, more particularly, to the manufacture of optical fiber that includes a cleaning step that removes metals or metal oxides, or both, from a porous glass body from which an optical fiber is eventually formed.

BACKGROUND

Optical fiber is sometimes used as a medium to transmit light, often with data embedded therein. The optical fiber sometimes includes a core and a cladding surrounding the core. The core sometimes has a higher index of refraction than the cladding. In such instances, the light transmits through the core, without substantially escaping from the core into the cladding, due to total internal reflection within the core. After transmitting through the optical fiber, the light is converted into an electrical signal with the data embedded therein.

In the manufacture of optical fiber, an initial step is sometimes the generation of a preform. To make the preform, an outside vapor deposition (OVD) process is sometimes utilized. With OVD, what would become the inner most part of the core is formed by depositing silica soot doped with a dopant (to increase the index of refraction) onto a rotating bait rod. A burner vaporizes the silica and dopant source materials, which then deposits layer-by-layer onto the bait rod. Undoped silica can then be added over the doped silica. After the addition of the core and cladding, and the removal of the bait rod, the preform is sometimes subjected to a heat treatment referred to as consolidation or sintering. The preform can then be heated and drawn into optical fiber.

However, there is a problem in that optical fiber drawn from a preform made using OVD can exhibit suboptimal attenuation. Attenuation means the loss of signal strength as light travels through the optical fiber.

SUMMARY

The present disclosure addresses that problem with a cleaning step that is performed after a first vapor deposition step that deposits a porous doped silica glass. The cleaning step utilizes a cleaning gas of a halogen gas, a hydrogen halide gas, or carbon monoxide, or a combination thereof. The cleaning gas removes metals or metal oxides from the porous doped silica glass, or changes the oxidation state of the metals or metal oxides within the porous doped silica glass. The porous doped silica glass, now with less metal or metal oxide content, or with metal or metal oxide content of a different oxidation state, is further processed into optical fiber. The optical fiber exhibits an attenuation that is less than an attenuation that the optical fiber would have exhibited but for the cleaning step.

According to a first aspect of the present disclosure, a method of manufacturing comprises: (a) a first vapor deposition step comprising vapor depositing a first porous glass body of a glass former and a doping constituent onto a substrate; (b) a cleaning step after the first vapor deposition step, the cleaning step comprising exposing the first porous glass body to a cleaning gas at a cleaning temperature for a cleaning period of time, the cleaning gas (i) removing a metal or metal oxide from the first porous glass body, (ii) changing an oxidation state of a metal or metal oxide within the first porous glass body, or (iii) a combination of (i) and (ii); and (c) a second vapor deposition step after the cleaning step, the second vapor deposition step comprising vapor depositing a second porous glass body of the glass former onto the first porous glass body resulting in a porous preform for an optical fiber.

According to a second aspect of the present disclosure, the method of the first aspect is presented, wherein the substrate comprises $Al_2O_3$.

According to a third aspect of the present disclosure, the method of any one of the first through second aspects is presented, wherein the glass former comprises $SiO_2$.

According to a fourth aspect of the present disclosure, the method of any one of the first through third aspects is presented, wherein the first vapor deposition step utilizes a burner that causes a first source material for the glass former and a first source material for the doping constituent to react and form layers of the first porous glass body onto the substrate.

According to a fifth aspect of the present disclosure, the method of the fourth aspect is presented, wherein the first source material for the glass former comprises $SiCl_4$.

According to a sixth aspect of the present disclosure, the method of any one of the fourth through fifth aspects is presented, wherein the first source material for the doping constituent comprises $GeCl_4$.

According to a seventh aspect of the present disclosure, the method of any one of the first through sixth aspects is presented, wherein the first porous glass body that is vapor deposited onto the substrate comprises $SiO_2$ doped with $GeO_2$.

According to an eighth aspect of the present disclosure, the method of any one of the first through seventh aspects further comprises a substrate removal step comprising removing the substrate from the first porous glass body before the cleaning step.

According to a ninth aspect of the present disclosure, the method of any one of the first through eighth aspects is presented, wherein the first porous glass body comprises a greater amount of the metal or metal oxide before the cleaning step than after the cleaning step.

According to a tenth aspect of the present disclosure, the method of any one of the first through ninth aspects is presented, wherein (i) the cleaning gas comprises a halogen gas, a hydrogen halide gas, or carbon monoxide; (ii) the cleaning temperature is greater than or equal to 800° C.; and (iii) the cleaning period of time is greater than or equal to 30 minutes.

According to an eleventh aspect of the present disclosure, the method of the tenth aspect is presented, wherein the cleaning gas comprises $Cl_2$.

According to a twelfth aspect of the present disclosure, the method of the tenth aspect is presented, wherein (i) the cleaning gas comprises the halogen gas or the hydrogen halide gas; (ii) the hydrogen gas or hydrogen halide gas of the cleaning gas comprises a partial pressure that is greater than or equal to 7 torr, (iii) the cleaning temperature is within a range of from 1000° C. to 1200° C., and (iv) the cleaning period of time is within a range of from 1.0 hour to 8.0 hours.

According to a thirteenth aspect of the present disclosure, the method of the tenth aspect is presented, wherein (i) the cleaning gas comprises carbon monoxide; and (ii) the carbon monoxide of the cleaning gas comprises a partial pressure that is within a range of from 1 torr to 10 torr.

According to a fourteenth aspect of the present disclosure, the method of any one of the tenth through thirteenth aspects is presented, wherein the cleaning gas further comprises $O_2$ for at least a portion of the cleaning period of time.

According to a fifteenth aspect of the present disclosure, the method of any one of the first through fourteenth aspects is presented, wherein the cleaning period of time is from about 2 hours to about 4 hours.

According to a sixteenth aspect of the present disclosure, the method of any one of the first through fifteenth aspects is presented, wherein the second vapor deposition step utilizes a burner that causes a second source material for the glass former to react and form layers of the second porous glass body on the first porous glass body.

According to a seventeenth aspect of the present disclosure, the method of the sixteenth aspect is presented, wherein the second source material for the glass former comprises $SiCl_4$.

According to an eighteenth aspect of the present disclosure, the method of the sixteenth aspect is presented, wherein the second source material for the glass former comprises octamethylcyclotetrasiloxane.

According to a nineteenth aspect of the present disclosure, the method of any one of the first through eighteenth aspects is presented, wherein the second porous glass body vapor deposited onto the first porous glass body comprises $SiO_2$.

According to a twentieth aspect of the present disclosure, the method of any one of the first through twentieth aspects is presented, wherein the first vapor deposition step, the cleaning step, and the second vapor deposition step each occur in a different furnace.

According to a twenty-first aspect of the present disclosure, the method of any one of the first through twentieth aspects further comprises: after the second vapor deposition step, a second cleaning step comprising exposing the porous preform to a cleaning gas at a cleaning temperature for a cleaning period of time, the cleaning gas (i) removing a metal or metal oxide from the porous preform, (ii) changing an oxidation state of a metal or metal oxide within the porous preform, or (iii) a combination of (i) and (ii).

According to a twenty-second aspect of the present disclosure, the method of any one of the first through twenty-first aspects is presented, wherein the first porous glass body comprises a greater weight percentage of the doping constituent than the second porous glass body.

According to a twenty-third aspect of the present disclosure, the method of any one of the first through twenty-second aspects further comprises a core sintering step comprising sintering the porous preform to form a sintered preform.

According to a twenty-fourth aspect of the present disclosure, the method of the twenty-third aspect further comprises a redraw step comprising redrawing the sintered preform into a core cane.

According to a twenty-fifth aspect of the present disclosure, the method of the twenty-fourth aspect further comprises (i) an outer cladding step comprising forming a porous outer cladding layer over the core cane; and (ii) a sintering step comprising sintering the porous outer cladding layer, resulting in an optical fiber preform.

According to a twenty-sixth aspect of the present disclosure, the method of any one of the first through twenty-fifth aspects further comprises an optical fiber draw step comprising drawing an optical fiber from an optical fiber preform made from the porous preform.

According to a twenty-seventh aspect of the present disclosure, the method of any one of the first through twenty-sixth aspects is presented, wherein (i) the optical fiber exhibits an attenuation of electromagnetic radiation having a wavelength of 1310 nm of less than or equal to 0.324 dB/km as measured with an optical time-domain reflectometer, and (ii) the optical fiber exhibits an attenuation of electromagnetic radiation having a wavelength of 1550 nm of less than or equal 0.185 dB/km as measured with an optical time-domain reflectometer.

DETAILED DESCRIPTION

Figure 1:
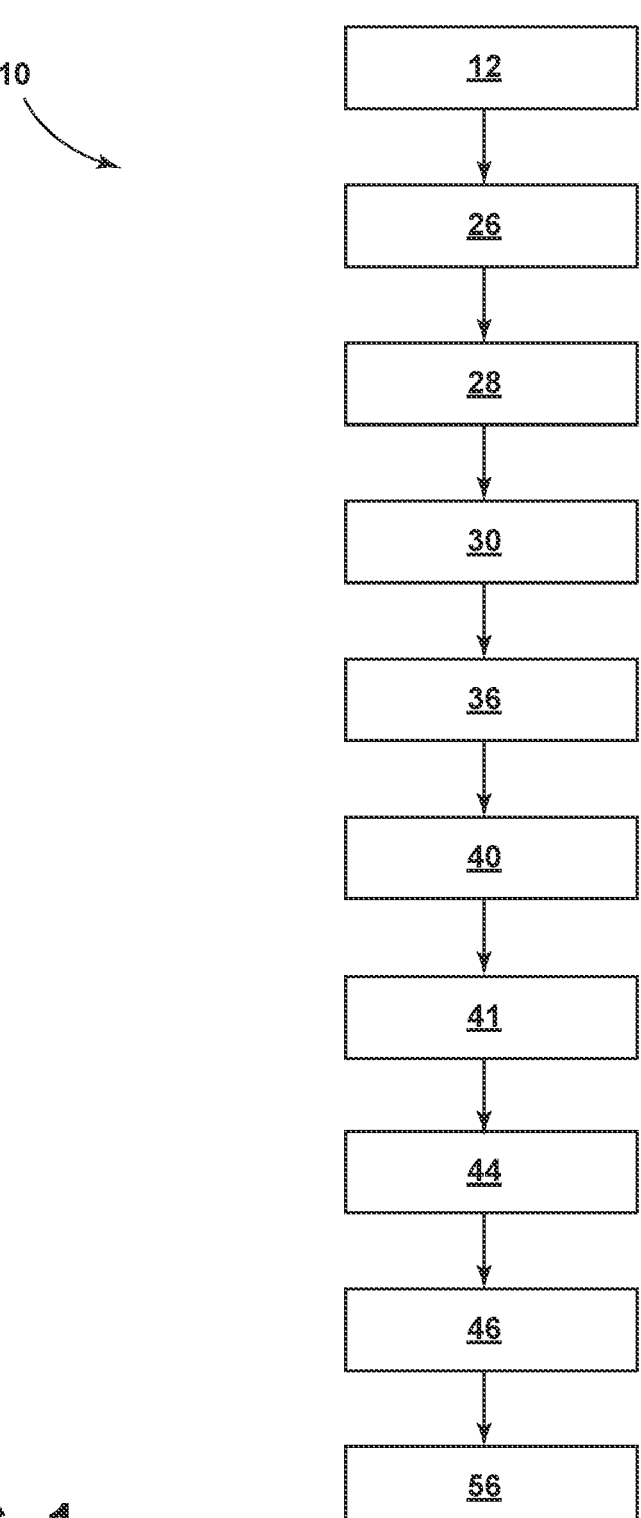
FIG. 1 is a schematic flow chart of a method of manufacturing according to the present disclosure that includes a vapor deposition step and a cleaning step.
Figure 2:
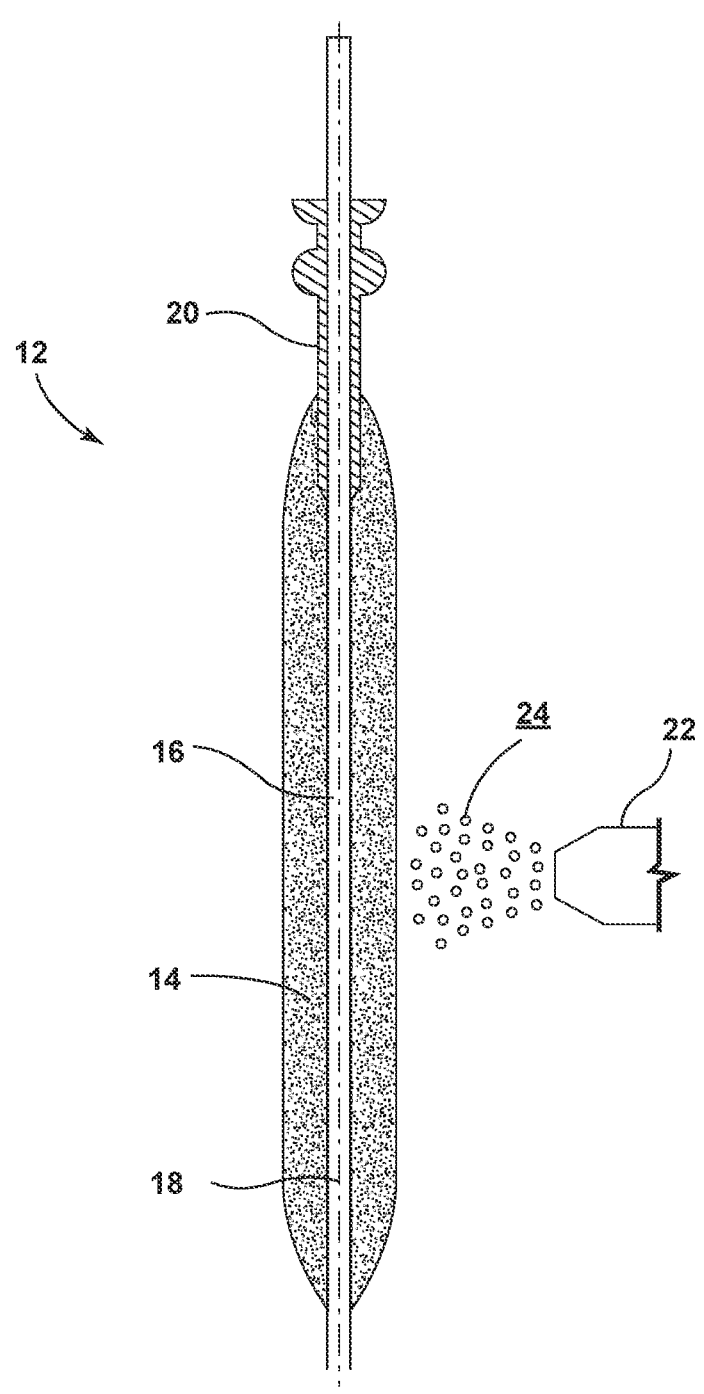
FIG. 2 is a conceptual illustration of the vapor deposition step of the method of FIG. 1, illustrating vapor deposition of a porous glass body on a substrate.

Referring to FIGS. 1-2, a method 10 of manufacturing is herein described that addresses the aforementioned attenuation problem. In a first vapor deposition step 12, the method 10 includes vapor depositing a first porous glass body 14 of a glass former and a doping constituent onto a substrate 16. Vapor deposition is the depositing of a thin film of material (here, the first porous glass body 14 of the glass former and the doping constituent) onto a substrate (here, the substrate 16) via a vapor phase. In general, source material for the material to be deposited is vaporized, such as through the application of heat. The vaporized source material reacts to form reaction products, and the reaction products are directed to the substrate 16 and formed thereupon as a thin film of the material.

For the first vapor deposition step 12, a variety of vapor deposition processes could be utilized. For example, a modified form of chemical vapor deposition (CVD) can be utilized. In this modified form of CVD, the substrate 16 with a centerline 18 is inserted through a hollow glass handle 20 and mounted on a lathe (not illustrated). The lathe rotates and translates the substrate 16 near a burner 22. The burner 22 produces a flame that heats the substrate 16. A gas mixture of a first source material for the glass former and a first source material for the doping constituent is introduced into the flame. The flame causes the gas mixture of the first source materials to react. The product or products 24 of the reaction deposit on the substrate 16 as layers of the first porous glass body 14. The layers accumulate until the desired size of the first porous glass body 14 is achieved. This modified form of CVD is sometimes referred to as outside vapor deposition (OVD). The product or products 24 of the reaction is sometimes referred to as "soot." The substrate 16 may be referred to as "bait substrate" or "bait rod." The reactions of the mixture of precursor gases within the flame are flame hydrolysis or oxidation reactions.

In embodiments, the substrate 16 (e.g., the bait rod) is a metal, a metal alloy, or a ceramic. In embodiments, the substrate 16 includes aluminum oxide (e.g., $Al_2O_3$). In other embodiments, the substrate 16 includes high-purity silica glass. The high-purity silica glass can be porous.

In embodiments, the first source material for the glass former is or includes silicon tetrachloride ($SiCl_4$). In other embodiments, the first source material for the glass former is or includes tetraethyl orthosilicate (TEOS), silane ($SiH_4$), or octamethylcyclotetrasiloxane ($[CH_3]_2SiO]_4$, also known as $D_4$). Other first source materials for the glass former are possible, and this list is not intended to be exclusive.

In embodiments, the first source material for the doping constituent is or includes germanium tetrachloride ($GeCl_4$). In other embodiments, the first source material for the doping constituent is or includes germane ($GeH_4$), diborane ($B_2H_6$), phosphine ($PH_3$), titanium tetrachloride ($TiCl_4$), titanium tetraisoproxide ($Ti(OCH(CH_3)_2)_4$), hydrogen fluoride (HF), tetrafluoromethane ($CF_4$), silicon tetrafluoride ($SiF_4$), aluminum chloride ($AlCl_3$), aluminum nitrate (Al ($NO_3)_3$), erbium chloride ($ErCl_3$), or erbium nitrate (Er ($NO_3)_3$). Other first source materials for the doping constituent are possible, and this list is not intended to be exclusive.

In some instances, the gas mixture for the first vapor deposition step 12 includes oxygen gas ($O_2$).

As a consequence of the first vapor deposition step 12, the first porous glass body 14 that is vapor deposited onto the substrate 16 includes $SiO_2$ as the glass. In embodiments, the doping constituent is $GeO_2$. Other doping constituents can be utilized. For example, the dopant can be or can include $P_2O_5$, $SiF_4$, $B_2O_3$, $Al_2O_3$, $Er_2O_3$, or $TiO_2$, depending on the first source material for the doping constituent used in the first vapor deposition step 12. This list is not meant to be exclusive and other doping constituents are possible. During the first vapor deposition step 12, when the reaction products condense to form the first porous glass body 14, atoms of the doping constituent (e.g., Ge atoms) or oxides of the doping constituent (e.g., $GeO_2$) take the place of silicon atoms or silica ($SiO_2$) in the silica network of the first porous glass body 14. The incorporation of the doping constituent modifies one or more properties of the portion of an optical fiber formed from the first porous glass body 14, such as the index of refraction.

In embodiments, the method 10 further comprises a substrate removal step 26. The substrate removal step 26 occurs after the first vapor deposition step 12. The substrate removal step 26 includes removing the substrate 16 from the first porous glass body 14. In embodiments, before the first vapor deposition step 12, a coating of a release agent is applied to the substrate 16. An example release agent is a carbonaceous material such as carbon soot. The carbon soot constitutes a sacrificial layer that prevents adhesion of the first porous glass body 14 to the substrate 16. During formation of first porous glass body 14, the sacrificial carbon layer is progressively oxidized and vaporized to create a narrow gap between the substrate 16 and the first porous glass body 14. The narrow gap facilitates removal of the substrate 16 from the first porous glass body 14. Other release agents can be utilized.

Figure 3:
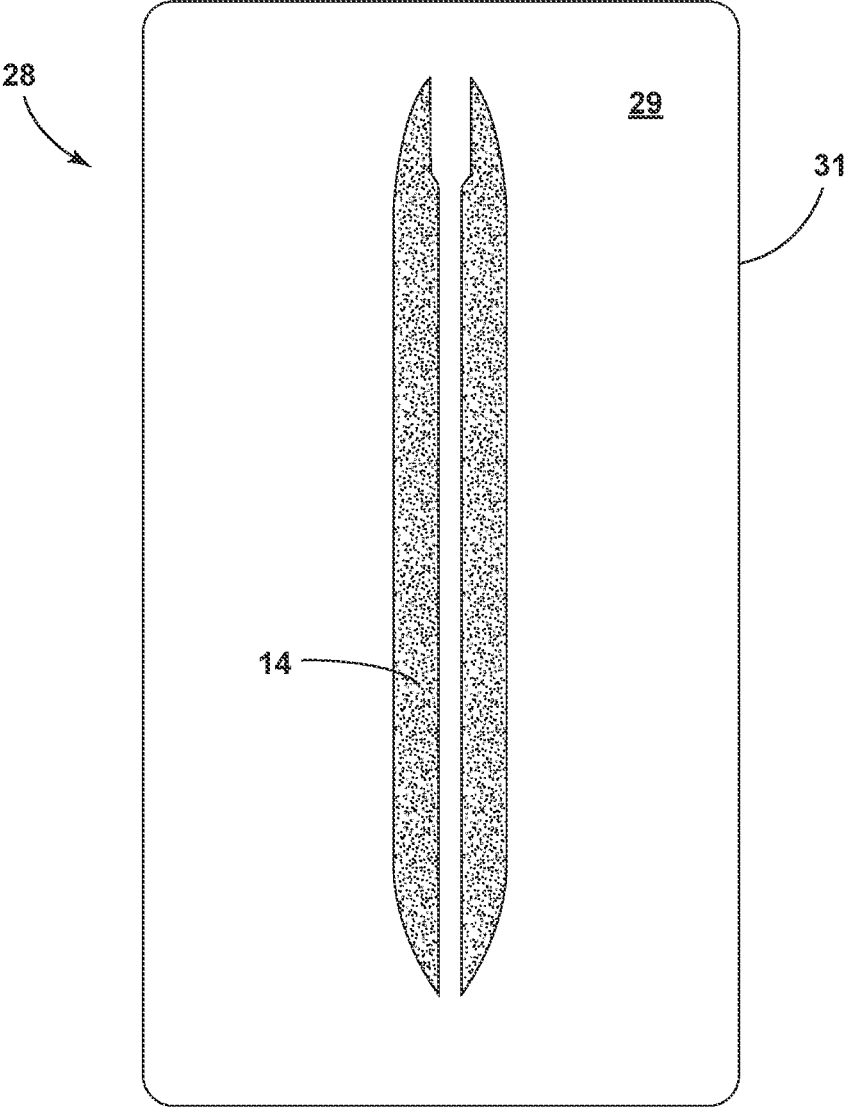
FIG. 3 is a conceptual illustration of the cleaning step of the method of FIG. 1, illustrating the porous glass body of FIG. 2 placed within a furnace and subjected to a cleaning temperature in the presence of a cleaning gas to remove one or more metals from the porous glass body and/or change the oxidation state(s) of one or more metals or metal oxides within the porous glass body.

Referring additionally to FIG. 3, the method 10 further includes a cleaning step 28. The cleaning step 28 occurs after the first vapor deposition step 12 and, if performed, the substrate removal step 26. The cleaning step 28 includes exposing the first porous glass body 14 to a cleaning gas 29 at an elevated temperature for a cleaning period of time. The cleaning gas 29 either (i) removes a metal or metal oxide from the first porous glass body 14, (ii) changes an oxidation state of a metal or metal oxide within the first porous glass body 14, or (iii) a combination of both (i) and (ii). In short, the first porous glass body 14 includes a greater amount of the metal or metal oxide before the cleaning step 28 than after the cleaning step 28.

Without being bound by theory, it is believed that the first vapor deposition step 12 may cause the formation of one or more metals or metal oxides within the first porous glass body 14, in addition to the formation of the glass former and doping constituent. The one or more metals or metal oxides may arise from impurities in the first source material or doping constituent, or as contaminants from the apparatus used for vapor deposition. The one or more metals or metal oxides are undesirable because, it is theorized, the one or more metals or metal oxides increases the attenuation that the resulting optical fiber exhibits. The one or more metals or metal oxides that are theorized to be in the first porous glass body 14 are difficult to quantify, because they may exist in the parts per billion range. The removal of the one or more metals or metal oxides, or alteration of the oxidation state of the one or more metals or metal oxides, in the cleaning step 28, decreases the attenuation of the optical fiber made from the first porous glass body 14.

To perform the cleaning step 28, the first porous glass body 14 is placed in a furnace 31, the temperature inside the furnace 31 is elevated to the cleaning temperature, and the cleaning gas 29 is introduced into the furnace 31 where the first porous glass body 14 was placed. In embodiments, the cleaning gas 29 used in the cleaning step 28 includes one or more of a halogen gas, a hydrogen halide gas, and carbon monoxide (CO). Examples of a halogen gas and a hydrogen halide gas include chlorine gas ($Cl_2$) and hydrogen chloride gas (HCl), respectively. In embodiments, the hydrogen gas or hydrogen halide gas of the cleaning gas 29 has a partial pressure that is greater than or equal to 7 torr (~933 Pa). In other embodiments, the carbon monoxide of the cleaning gas 29 has a partial pressure that is within a range of from 1 torr (~133 Pa) to 10 torr (~1333 Pa).

Without being bound by theory, it is believed that halogen gas and hydrogen halide gas react with metals and metal oxides to form gas metal halides that diffuse out of the first porous glass body. Similarly, it is believed that carbon monoxide reacts with metal oxides to form metal and carbon dioxide. For example, chlorine gas ($Cl_2$) and hydrogen chloride gas (HCl) react with metals and metal oxides to form gas metal chlorides. In the instance where the metal and metal oxide are iron (Fe) and ferric oxide ($Fe_2O_3$) respectively, the following reactions can occur:

$$Fe_2O_3 + 3CO \Rightarrow 2Fe + 3CO_2$$

$$Fe + 2HCl \Rightarrow FeCl_2 + H_2$$

$$Fe_2O_3 + 6HCl \Rightarrow 2FeCl_3 + 3H_2O$$

$$Fe + \frac{3}{2}Cl_2 \Rightarrow FeCl_3$$

$$Fe_2O_3 + 3Cl_2 \Rightarrow 2FeCl_3 + \frac{3}{2}O_2$$

The reaction between ferric oxide ($Fe_2O_3$) and carbon monoxide (CO) to generate iron (Fe) makes the reactions generating the ferrous chloride ($FeCl_2$) and ferric chloride ($FeCl_3$) more efficient. As mentioned, the ferrous chloride ($FeCl_2$) and ferric chloride ($FeCl_3$) are apt to diffuse out of the first porous glass body 14. Different halogen gases and hydrogen halide gases react with other metals and metal oxides in similar ways to generate easily diffusible gas metal halides.

In embodiments, the cleaning temperature is greater than or equal to 800° C. In embodiments, the cleaning temperature is within a range of from 800° C. to 1200° C. In embodiments, the cleaning temperature is within a range of from 1000° C. to 1200° C. In embodiments, the cleaning temperature is 800° C., 850° C., 900° C., 950° C., 1000° C., 1050° C., 1100° C., 1150° C., or 1200° C., or within any range bound by any two of those values (e.g., from 1050° C. to 1150° C., from 900° C. to 1100° C., and so on). The cleaning temperature is below the temperature that would initiate sintering and densification (discussed further below) of the first porous glass body 14. The porosity of the first porous glass body 14 facilitates removal of the one or more metals or metal oxides and/or changes in oxidation state of the one or more metals or metal oxides. When the cleaning temperature is below 800° C., removal of the one or more metals or metal oxides and/or changes in oxidation state of the one or more metals or metal oxide are unlikely to occur to a sufficient degree. When the cleaning temperature is above 1200° C., sintering and densification is likely to occur to an undesirable degree before the metal halides are created and diffused out of the first porous glass body 14.

In embodiments, the cleaning period of time of the cleaning step 28 is greater than or equal to 30 minutes. In embodiments, the cleaning period of time is within a range of from 1.0 hour to 8.0 hours. In embodiments, the cleaning period of time is 30 minutes, 1.0 hour, 1.5 hours, about 2 hours, 2.0 hours, 2.5 hours, 3.0 hours, 3.5 hours, about 4 hours, 4.0 hours, 4.5 hours, 5.0 hours, 5.5 hours, 6.0 hours, 6.5 hours, 7.0 hours, 7.5 hours, or 8.0 hours, or within any range bound by any two of those values (e.g., from 1.0 hour to 2.5 hours, from 2.0 hours to 5.5 hours, from about 2 hours to about 4 hours, and so on). When the cleaning period of time is less than 30 minutes, the cleaning step 28 is unlikely to have removed a sufficient amount of the one or more metals or metal oxides, or changed the oxidation state of the one or more metals or metal oxides, within the first porous glass body 14. When the cleaning period of time exceeds 8.0 hours, the cleaning step 28 is likely to remove an undesirable amount of the dopant (e.g., Ge or $GeO_2$) from the first porous glass body 14 and can excessively oxidize the $SiO_2$ of the first porous glass body 14.

In embodiments, the cleaning gas 29 further includes oxygen gas ($O_2$) for at least a portion of the cleaning period of time. For example, the portion of the cleaning period of time in which the cleaning gas 29 includes oxygen gas is about 30 minutes. It is believed that the oxygen gas further improves attenuation of the optical fiber eventually produced from the first porous glass body 14, and the reasons for the improvement are not known precisely.

Figure 4:
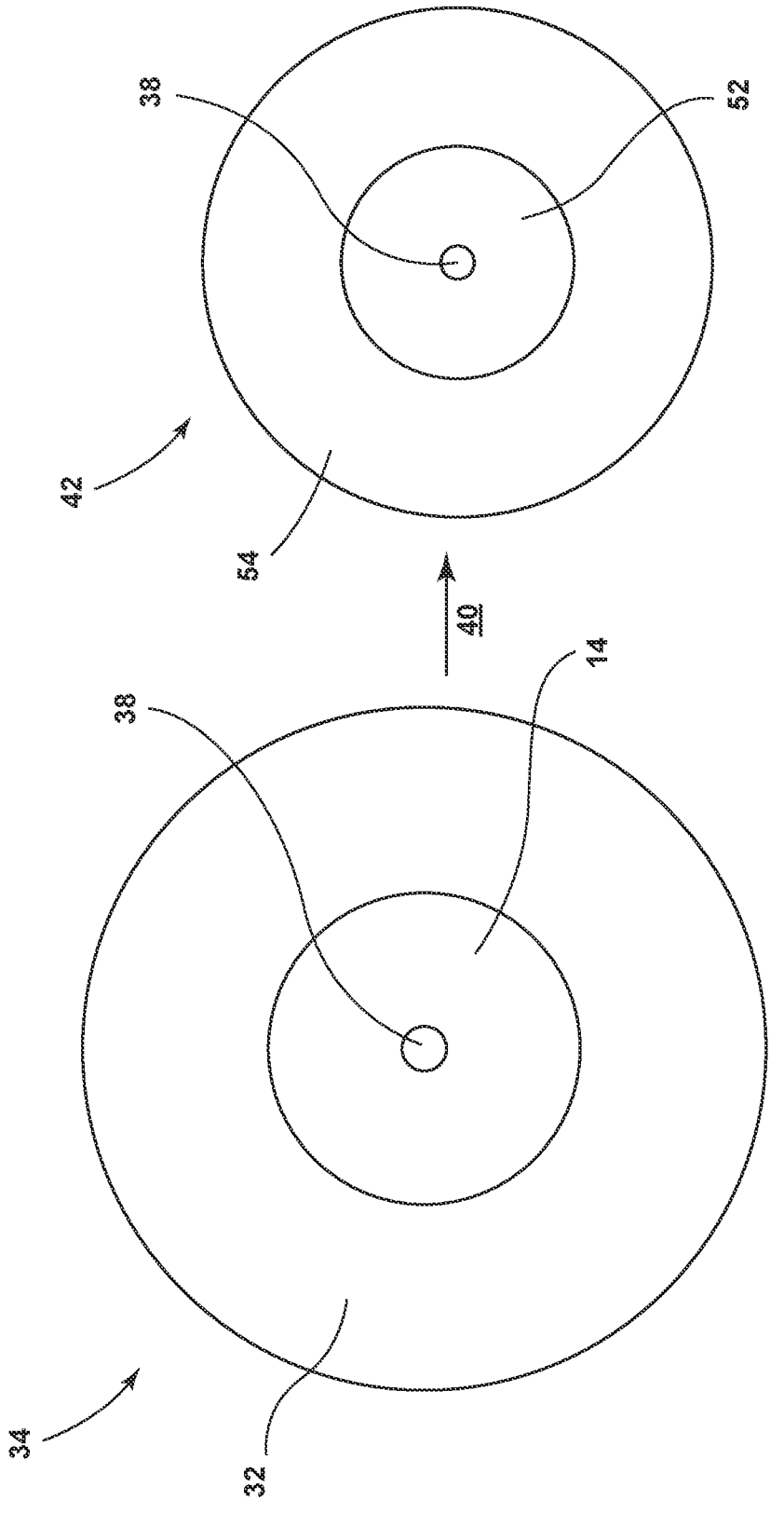
FIG. 4 is an elevational view of a cross-section of a porous preform made according to the method of FIG. 1, illustrating a first porous glass body and a second porous glass body disposed thereupon, and the transformation of the porous preform into a sintered preform due to performing a core sintering step of the method of FIG. 1.

The method 10 further includes a second vapor deposition step 30. The second vapor deposition step 30 includes depositing a second porous glass body 32 of a glass former onto the first porous glass body 14. Referring additionally to FIG. 4, the result of the second vapor deposition step 30 is a porous preform 34 for an optical fiber. The second vapor deposition step 30 occurs after the cleaning step 28. As mentioned, the glass former of second porous glass body 32 can be silicon dioxide ($SiO_2$).

Like the first vapor deposition step 12, in embodiments, the second vapor deposition step 30 is an OVD process that utilizes a burner 22 that produces a flame. A second source material for the glass former is introduced to the flame, and the second source material reacts. The product of the reaction is deposited as layers of the second porous glass body 32 on the first porous glass body 14. The first vapor deposition step 12 and the second vapor deposition step 30 collectively can be referred to as a "soot-on-soot" deposition process. In embodiments, after the second vapor deposition step 30, porous silicone dioxide ($SiO_2$) is disposed over porous silicon dioxide doped with germanium dioxide ($GeO_2$).

In embodiments, the second source material for the glass former is or includes silicon tetrachloride ($SiCl_4$). In other embodiments, the second source material for the glass material is or includes tetraethyl orthosilicate (TEOS), silane ($SiH_4$), or octamethylcyclotetrasiloxane ($[CH_3)_2SiO]_4$, also known as $D_4$). Other second source materials for the glass material are possible, and this list is not intended to be exclusive. In embodiments, no doping constituent is used in the second vapor deposition step 30. In embodiments, second porous glass body 32 consists essentially of silicon dioxide ($SiO_2$).

The use of silicon tetrachloride ($SiCl_4$) in particular may further remove the one or more metals or metal oxides (or change the oxidation state of the one or more metals or metal oxides) still present in the first porous glass body 14. In addition to $SiO_2$, burning the $SiCl_4$ in the presence of oxygen gas ($O_2$) produces chlorine gas ($Cl_2$). Further, the combustion of the methane gas ($CH_4$) present producing the flame at the burner 22 generates water ($H_2O$) in addition to carbon monoxide (CO) and oxygen gas ($O_2$). In turn, the chlorine gas ($Cl_2$) and the water ($H_2O$) react to generate hydrogen chloride gas (HCl) and oxygen ($O_2$). As discussed above, the chlorine gas ($Cl_2$) and the hydrogen chloride gas (HCl) react with metals and metal oxides to form gas metal chlorides that diffuse out of the first porous glass body 14.

In embodiments, the first vapor deposition step 12, the cleaning step 28, and the second vapor deposition step 30 each occur in a different furnace. For example, only the cleaning 28 occurs in the furnace 31, while the first vapor deposition step 12 and the second vapor deposition step 30 occur in different furnaces. One benefit of those steps occurring in different furnaces is that each of the steps 12, 28, 30 can occur simultaneously. Doing so quickens the production process of the optical fiber eventually produced and permits use of different source materials for the glass formers of first porous glass body 14 and second porous glass body 32 in the different furnaces. In an embodiment, $SiCl_4$ is used as a source material for first porous glass body 14 in a first furnace and octamethyltetrasiloxane is used as a source material for second porous glass body 32 in a second furnace. However, the first vapor deposition step 12, the cleaning step 28, and the second vapor deposition step 30 need not all occur in different furnaces.

In embodiments, the method 10 further includes a second cleaning step 36. The second cleaning step 36 occurs after the second vapor deposition step 30. The second cleaning step 36 includes exposing the porous preform 34 to a cleaning gas 29 at a cleaning temperature for a cleaning period of time, such as within the furnace 31. The cleaning gas 29 (i) removes a metal or metal oxide from the porous preform 34, (ii) changes an oxidation state of a metal or metal oxide within the porous preform 34, or (iii) a combination of (i) and (ii). The discussion of the cleaning step 28 applies equally as well to the second cleaning step 36, without the need to repeat the discussion here.

Referring still to FIG. 4, after the second vapor deposition step 30, the porous preform 34 thus formed includes the second porous glass body 32 disposed radially around the first porous glass body 14. Due to the removal of the substrate 16 at the substrate removal step 26, the porous preform 34 further includes an internal cavity 38 corresponding to the space formally occupied by the substrate 16. The first porous glass body 14 includes a greater weight percentage of the doping constituent (e.g., the dopant) than the second porous glass body 32. In embodiments, the first porous glass body 14 includes a greater weight percentage of germanium dioxide ($GeO_2$) than the second porous glass body 32.

In embodiments, the method 10 further includes a core sintering step 40. The core sintering step 40 includes sintering the porous preform 34 to form a sintered preform 42. The core sintering step 40 collapses the pores within the porous preform 34. In embodiments, the core sintering step 40 occurs at temperatures above about 1300° C. and induces compaction of the porous preform 34 via collapse of the pore structure to provide a fully densified glass body (the sintered preform 42) with a first core portion 52 and a second core portion 54 surrounding the first core portion 52.

Figure 5:
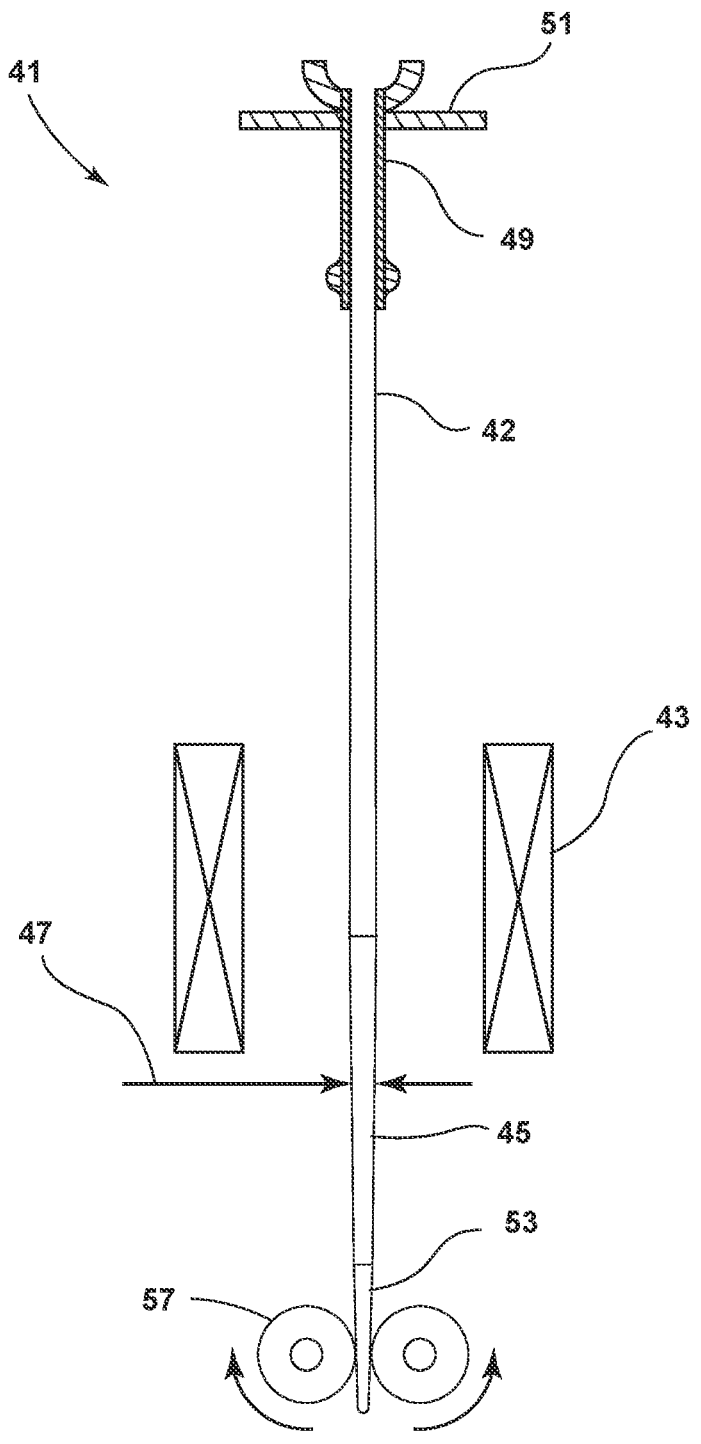
FIG. 5 is a conceptual illustration of a redraw step of the method of FIG. 1, illustrating numerous core canes being drawn from the sintered preform of FIG. 4.

Referring additionally to FIG. 5, the method further includes a redraw step 41. For the redraw step 41, the sintered preform 42 is heated in a redraw furnace 43 and drawn into a core cane 45 having a diameter 47 smaller than the original diameter of the sintered preform 42. More specifically, a glass handle 49 is attached to the sintered preform 42 and the sintered preform 42 is mounted in a moving downfeed support 51 above the redraw furnace 43. A sacrificial glass rod 53, which may be attached to the bottom of the sintered preform 42, is pulled by motor-driven tractors 57, thereby causing the core cane 45 to be drawn at a suitable rate. The diameter 47 of the core cane 45 resulting from the redraw step 41 is preferably in the range of from 15 mm to 35 mm, such as from 24 mm to 26 mm. During the redraw step 41 numerous core canes 45 are formed from the sintered preform 42, and the internal cavity 38 is collapsed, due to the decrease in the diameter 47. In other words, the internal cavity 38 present in the sintered preform 42 is not present in the core canes 45.

Figure 6:
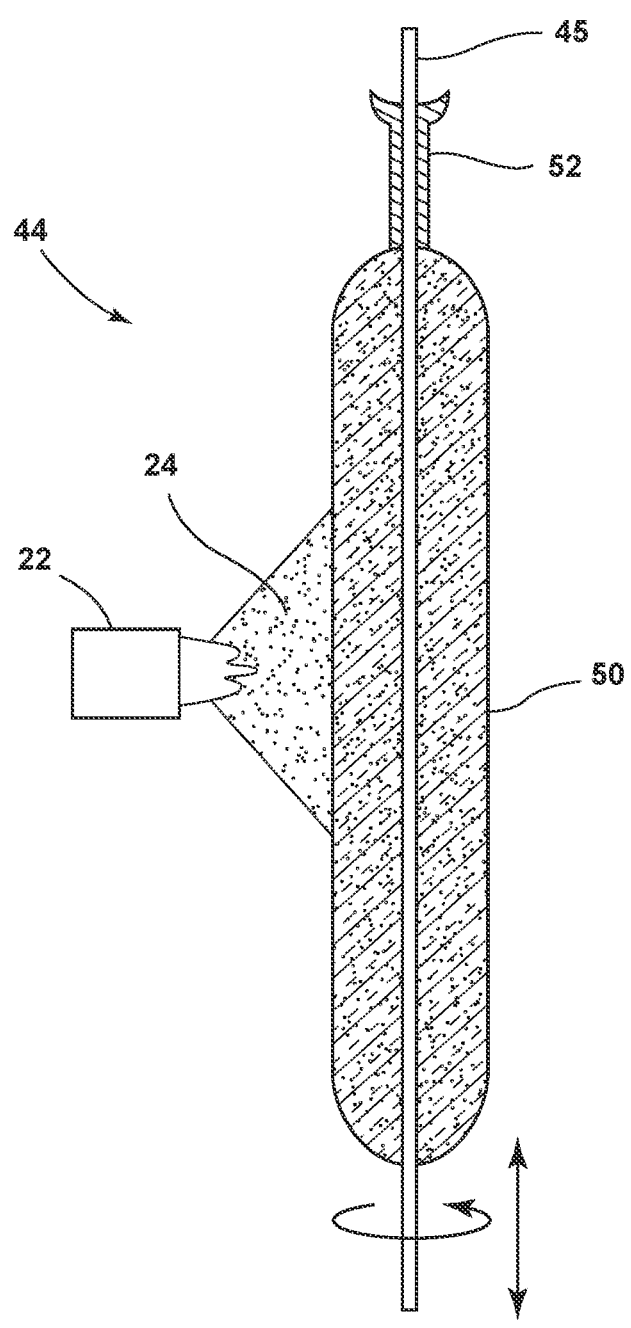
FIG. 6 is a conceptual illustration of an outer cladding step of the method of FIG. 1, illustrating the vapor deposition of a porous outer cladding layer onto the core cane of FIG. 5.

Referring additionally to FIG. 6, in embodiments, the method 10 further includes an outer cladding step 44. The outer cladding step 44 includes forming a porous outer cladding layer 50 over the core cane 45. The core cane 45 can be used as a bait substrate upon which the porous outer cladding layer 50 is deposited as overclad using a chemical vapor deposition method, such as that with the burner 22 as described above. A glass handle 42 is attached to the core cane 54, and the reaction products 24 (e.g., $SiO_2$) made from burning source material are formed upon the core cane 45. The source material can be octamethylcyclotetrasiloxane, among other options.

Figure 7:
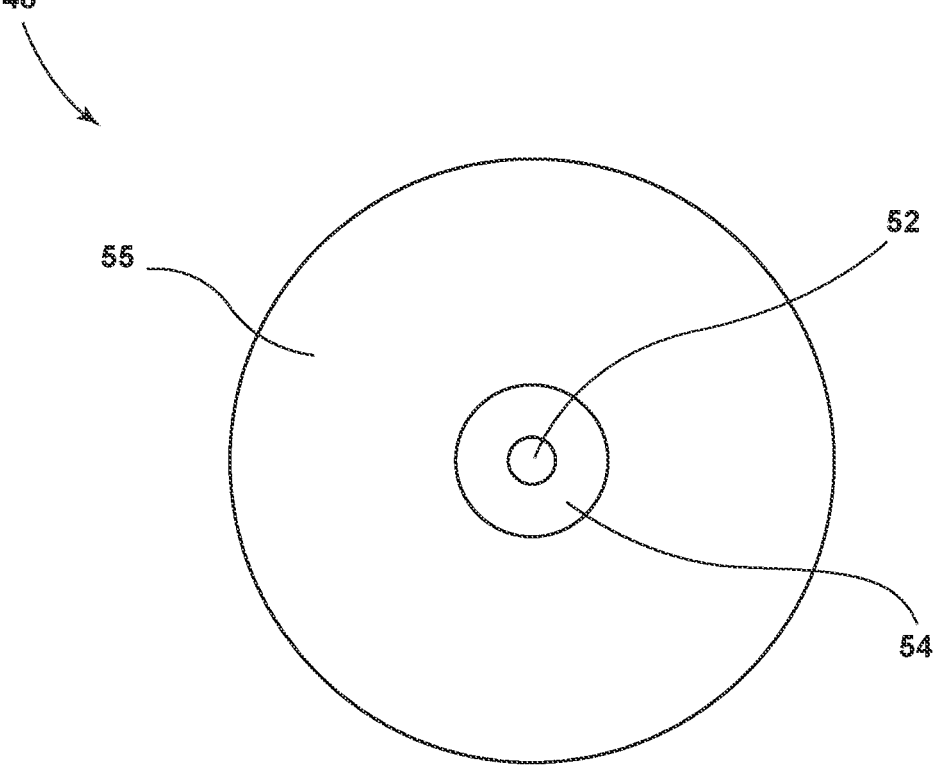
FIG. 7 is an elevational view of a cross-section of an optical fiber preform after another sintering step of the method of FIG. 1 that sinters the porous outer cladding layer added via the outer cladding step of FIG. 6, illustrating an outer cladding layer over a second core portion over a first core portion.

Referring additionally to FIG. 7, in embodiments, the method 10 further includes another sintering step 46 of sintering the porous outer cladding layer 50. The sintering of the porous outer cladding layer 50 occurs at temperatures above about 1300° C. and induces compaction of the porous outer cladding layer 50 via collapse of the pore structure to provide again a fully densified glass body, this time referred to as an optical fiber preform 48. The optical fiber preform 48 thus includes an outer cladding layer 55 from the outer porous cladding layer 50, the first core portion 52 from the core cane 54 (via the first porous glass body 14), and the second core portion 54 from the core cane 54 (via the second porous glass body 32). The first core portion 52 and the second core portion 54 can be referred to as the primary core portion and the secondary core portion respectively. The outer cladding layer 55 is disposed over the second core portion 54, which is disposed over the first core portion 52.

Figure 8:
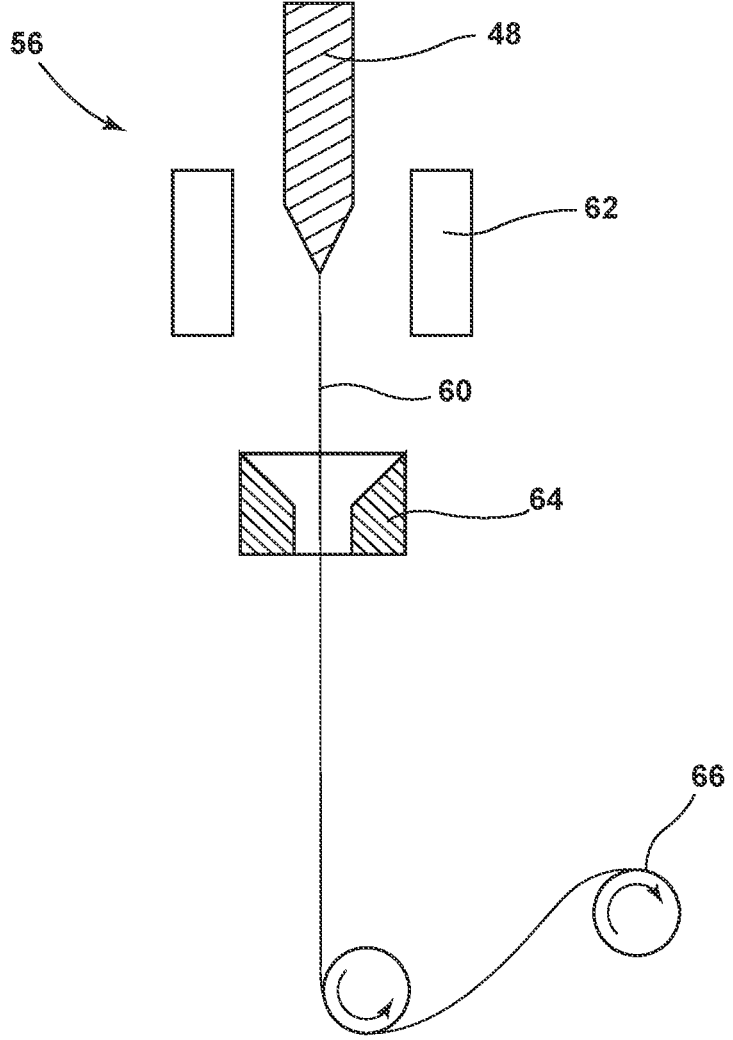
FIG. 8 is a schematic illustration of optical fiber being drawn from the optical fiber preform of FIG. 7.

Referring additionally to FIG. 8, in embodiments, the method 10 further comprises an optical fiber draw step 56. The optical fiber draw step 56 includes drawing an optical fiber 60 from a preform (e.g., the optical fiber preform 48) made from the porous preform 34. Note that there are ways to make a preform from which the optical fiber 60 can be drawn that do not include the outer cladding step 44 and the sintering step 46. For example, the first porous glass body 14 can itself be a cladding layer in a cane-in-soot process. In any event, the drawing of optical fiber 60 from the optical fiber preform 50 can be accomplished by placing the optical fiber preform 50 in a drawing tower, heating the optical fiber preform 48 with heating elements 62 to soften the glass network, pulling a thin strand of glass as the optical fiber 60 from the softened optical fiber preform 50, coating the optical fiber 60 at a coater 64, and then spooling the optical fiber 60 on a spool 66.

In embodiments, due considerably to the cleaning step 28, the optical fiber exhibits acceptable levels of attenuation. In embodiments, the optical fiber exhibits an attenuation of electromagnetic radiation having a wavelength of 1310 nm of less than or equal to 0.32 dB/km. In embodiments, the optical fiber exhibits an attenuation of electromagnetic radiation having a wavelength of 1550 nm of less than or equal to 0.18 dB/km. In embodiments, the optical fiber exhibits an attenuation of electromagnetic radiation having a wavelength of 1310 nm of less than or equal to 0.324 dB/km. In embodiments, the optical fiber exhibits an attenuation of electromagnetic radiation having a wavelength of 1550 nm of less than or equal to 0.185 dB/km. Attenuation values are measured with an optical time-domain reflectometer in accordance with International Electrotechnical Commission (IEC) International Standard: IEC 60793-1-40 Method C.

Examples

Figure 9:
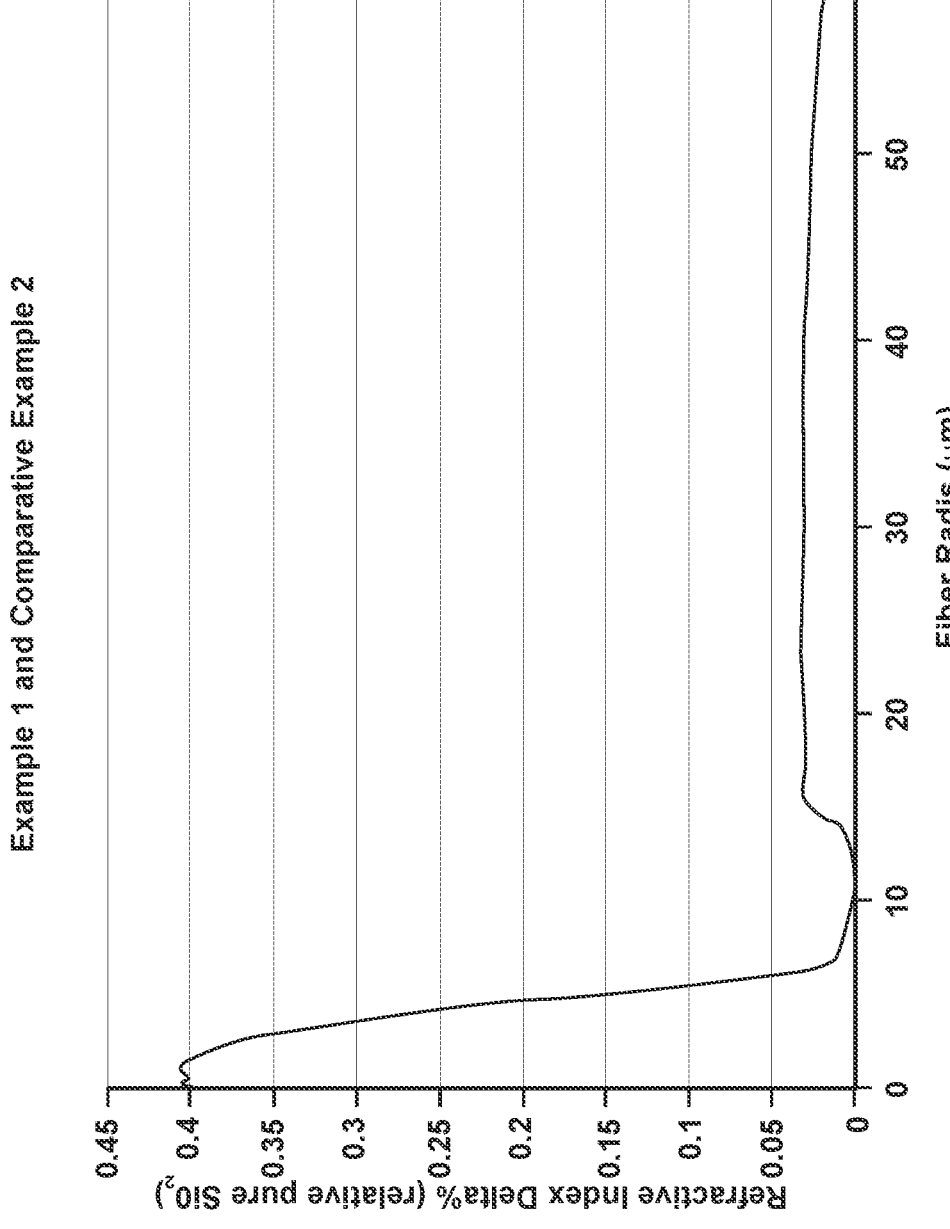
FIG. 9, pertaining to Example 1 and Comparative Example 2, is a graph plotting relative refractive index of the optical fiber at the core portion as a function of distance from the centerline of the optical fiber, illustrating that the relative refractive index gradually changes due to the management of the flow rate of the doping constituent source material (here, $GeCl_4$) during the first vapor deposition step.

Example 1—In Example 1, a first vapor deposition step was conducted to deposit a first porous glass body of $SiO_2$ as a glass former and $GeO_2$ as a doping constituent onto a substrate. The first source material for the glass former was $SiCl_4$. The first source material for the $GeO_2$ was $GeCl_4$. The flow rate of the $GeCl_4$ was controlled during the first vapor deposition step in order to produce a graded core profile in the optical fiber, with a-profile having, for example, a-value within a range of greater than 2 to 6, exhibiting a relative (to $SiO_2$) refractive index (A) of from 0% to 0.5%. The relative refractive index changes as a function of position from the centerline, as illustrated in FIG. 9, due to the managed flow rate of $GeCl_4$ during the first vapor deposition step. The wavelength for the relative refractive index values of FIG. 9 is 1550 nm.

The first porous glass body was then subjected to a cleaning step. For the cleaning step, the first porous glass body was placed in a furnace and exposed to a cleaning gas of $Cl_2$ at a cleaning temperature of about 1125° C. for a cleaning period of time of two hours. For the first 30 minutes 5-6% $O_2$ was also added. The $Cl_2$ flow rate was 5 slpm (standard liters per minute). The cleaned first porous glass body was then subjected to a second vapor deposition step to deposit a second porous glass body of the glass former onto the first porous glass body. The second source material for the glass former for the second vapor deposition step was oxymethylcyclotetrasiloxane. The first vapor deposition step, the cleaning step, and the second vapor deposition step all occurred in different furnaces. The result was a porous preform for an optical fiber. The porous preform was then subjected to a core sintering step and a redraw step to form core canes. One of the core canes was subjected to an outer cladding step to apply a porous outer cladding layer of SiO2 from octamethylcyclotetrasiloxane source material, which was then subjected to another sintering step to form an optical fiber preform. The optical fiber preform was then subjected to an optical fiber draw step to obtain numerous samples of optical fiber for testing.

Figure 10:
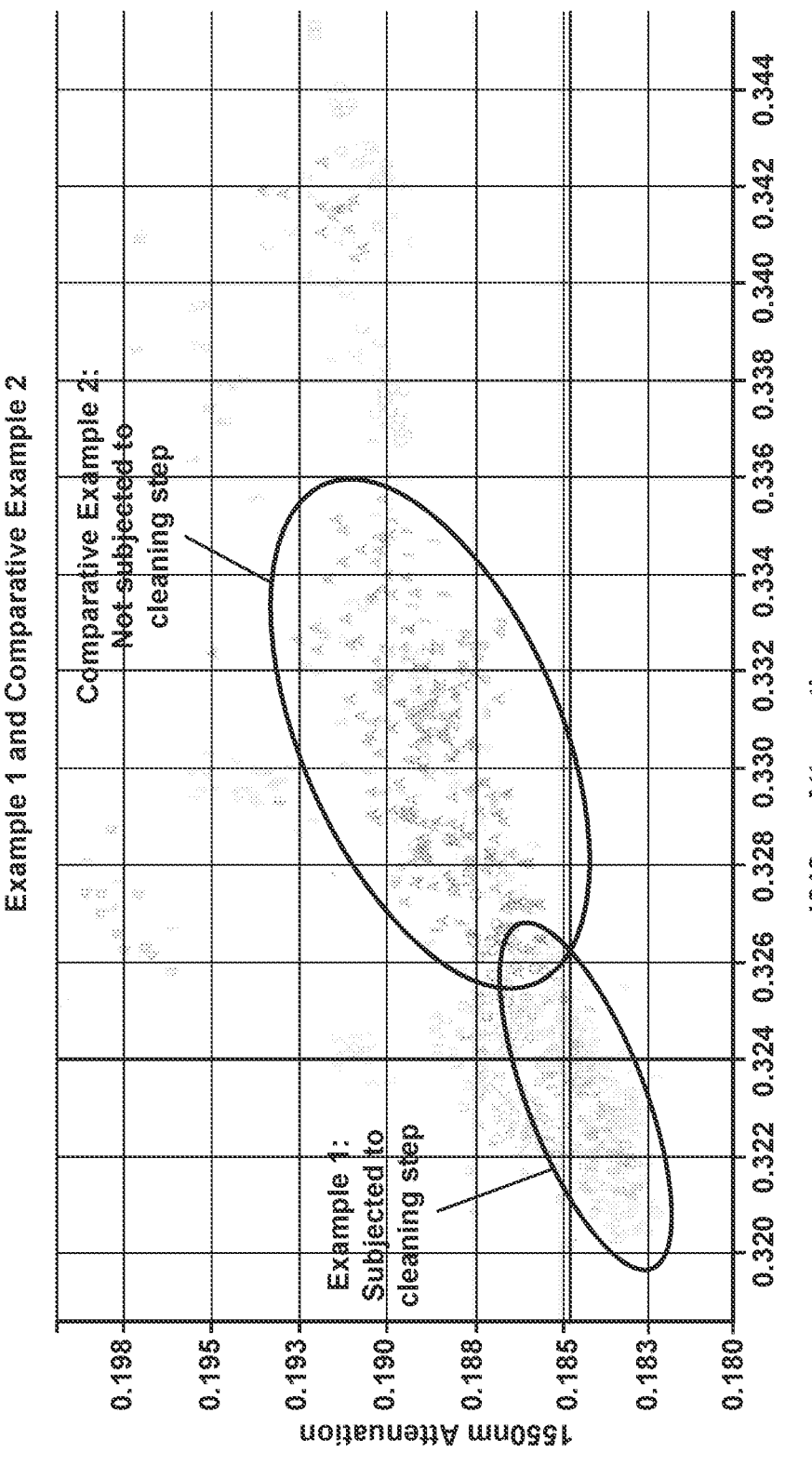
FIG. 10, pertaining to Example 1 and Comparative Example 2, is a graph plotting attenuation at 1550 nm as a function of attenuation at 1310 nm, illustrating that optical fibers made pursuant to the method of FIG. 1 with the cleaning step of FIG. 3 exhibits lower attenuation than optical fibers made pursuant to a method that lacks a cleaning step.

The attenuation of the optical fiber samples was measured. The attenuation measurements for each sample was recorded. A graphical plot of the attenuation measurements for Example 1 is reproduced at FIG. 10. As the graph illustrates, many of the attenuation measurements of electromagnetic radiation having a wavelength of 1310 nm were under 0.324 dB/km. Similarly, many of the attenuation measurements of electromagnetic radiation having a wavelength of 1550 nm were under 0.185 dB/km.

Comparative Example 2—In Comparative Example 2, numerous samples of optical fibers were made in the same manner as the samples of Example 1, except that no cleaning step was performed. The attenuation measurements for each sample was recorded. A graphical plot of the attenuation measurements for Comparative Example 2A is also reproduced at FIG. 10. As the graph illustrates, all of the attenuation measurements of electromagnetic radiation having a wavelength of 1310 nm were over 0.324 dB/km. Likewise, all of the attenuation measurements of electromagnetic radiation having a wavelength of 1550 nm were over 0.185 dB/km. It is thus demonstrated that the cleaning step of the first porous glass body reduces the attenuation that the resulting optical fiber exhibits.

Figure 11:
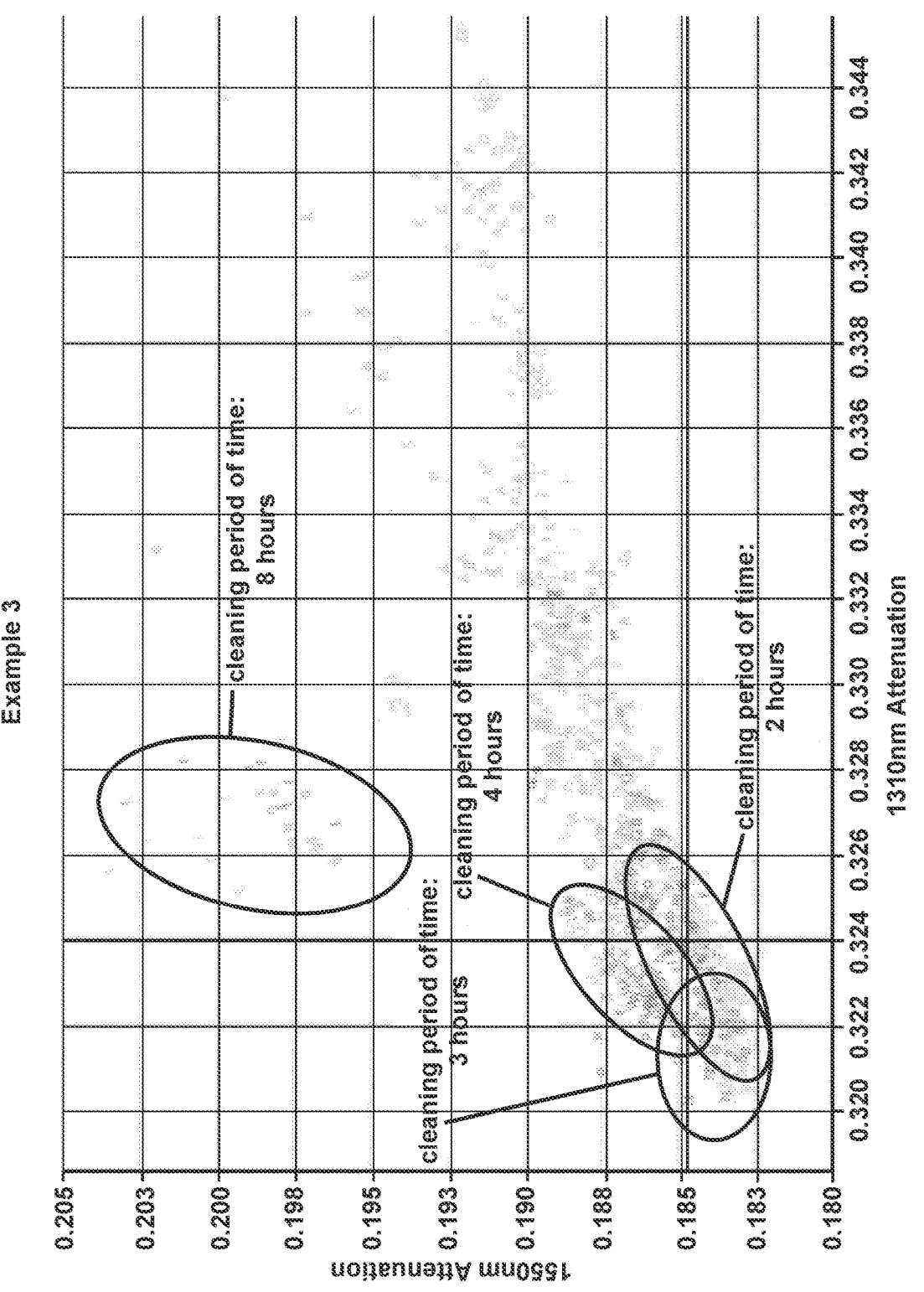
FIG. 11, pertaining to Example 3, is a graph plotting attenuation at 1550 nm as a function of attenuation at 1310 nm, illustrating that optical fibers subjected to the cleaning step of FIG. 3 for about 2 hours to about 4 hours exhibit lower attenuation than optical fibers subjected to the cleaning step for 8 hours.

Example 3—In Example 3, numerous optical fibers were made in the same manner as the optical fibers of Example 1, including the cleaning step. The exception was that the cleaning period of time was varied. Four sets of sample optical fibers were produced, each with one of four different cleaning periods of time: 2 hours, 3 hours, 4 hours, and 8 hours. The attenuation measurements for each sample was recorded. A graphical plot of the attenuation measurements for Example 3 is also reproduced at FIG. 11. As the graph illustrates, the samples that included cleaning periods of time of 2 hours and 3 hours exhibited the lowest attenuation values of electromagnetic radiation having wavelengths of 1310 nm and 1550 nm. Many optical fibers of those sample groups (2 hours and 3 hours) exhibits attenuation at 1310 nm of under 0.324 dB/km and at 1550 nm of under 0.185 dB/km. The samples derived from the 4 hour cleaning period of time exhibited attenuation at 1310 nm generally under 0.324 dB/km but exhibited attenuation at 1550 nm generally over 0.185 db/km. The samples derived from the 8 hour cleaning period of time exhibited attenuation at 1310 nm of over 0.324 dB/km and exhibits attenuation at 1550 km of over 0.185 dB/km. Based on current data, the optimum cleaning period of time is from about 2 hours to about 4 hours. As previously mentioned, is theorized that longer cleaning period of times (e.g., after about 3 hours for Example 3) resulted in optical fibers that exhibited greater attenuation due to excessive oxidation of $SiO_2$ at the core portions.

What is claimed is:

1. A method of manufacturing comprising:
a first vapor deposition step comprising vapor depositing a first porous glass body of a glass former and a doping constituent onto a substrate;
a cleaning step after the first vapor deposition step, the cleaning step comprising exposing the first porous glass body to a cleaning gas at a cleaning temperature for a cleaning period of time, the cleaning gas (i) removing a metal or metal oxide from the first porous glass body, (ii) changing an oxidation state of a metal or metal oxide within the first porous glass body, or (iii) a combination of (i) and (ii); and
a second vapor deposition step after the cleaning step, the second vapor deposition step comprising vapor depositing a second porous glass body of the glass former onto the first porous glass body resulting in a porous preform for an optical fiber fiber; and
a substrate removal step comprising removing the substrate from the first porous glass body before the cleaning step.

2. The method of claim 1, wherein
the first vapor deposition step utilizes a burner that causes a first source material for the glass former and a first source material for the doping constituent to react and form layers of the first porous glass body onto the substrate.

3. The method of claim 2, wherein the first source material for the glass former comprises SiCl$_4$; and the first source material for the doping constituent comprises GeCl$_4$.

4. The method of claim 1, wherein the first porous glass body that is vapor deposited onto the substrate comprises SiO$_2$ doped with GeO$_2$; and the second porous glass body that is vapor deposited onto the first porous glass body comprises SiO$_2$.

5. The method of claim 1, wherein the first porous glass body comprises a greater amount of the metal or metal oxide before the cleaning step than after the cleaning step.

6. The method of claim 1, wherein the cleaning gas comprises a halogen gas, a hydrogen halide gas, or carbon monoxide;

the cleaning temperature is greater than or equal to 800° C.; and the cleaning period of time is greater than or equal to 30 minutes.

7. The method of claim 6, wherein the cleaning gas comprises the halogen gas or the hydrogen halide gas;

the halogen gas or hydrogen halide gas of the cleaning gas comprises a partial pressure that is greater than or equal to 7 torr;

the cleaning temperature is within a range of from 1000° C. to 1200° C.; and the cleaning period of time is within a range of from 1.0 hour to 8.0 hours.

8. The method of claim 7, wherein the cleaning gas comprises Cl$_2$.

9. The method of claim 6, wherein the cleaning gas comprises carbon monoxide;

the carbon monoxide of the cleaning gas comprises a partial pressure that is within a range of from 1 torr to 10 torr;

the cleaning temperature is within a range of from 1000° C. to 1200° C.; and the cleaning period of time is within a range of from 1.0 hour to 8.0 hours.

10. The method of claim 6, wherein the cleaning gas further comprises O2 for at least a portion of the cleaning period of time.

11. The method of claim 6, wherein the cleaning period of time is within a range of from about 2 hours to about 4 hours.

12. The method of claim 1, wherein the second vapor deposition step utilizes a burner that causes a second source material for the glass former to react and form layers of the second porous glass body on the first porous glass body.

13. The method of claim 12, wherein the second source material for the glass former comprises one or more of SiCl$_4$ and octamethylcyclotetrasiloxane.

14. The method of claim 1 further comprising:

after the second vapor deposition step, a second cleaning step comprising exposing the porous preform to a cleaning gas at a cleaning temperature for a cleaning period of time, the cleaning gas (i) removing a metal or metal oxide from the porous preform, (ii) changing an oxidation state of a metal or metal oxide within the porous preform, or (iii) a combination of (i) and (ii).

15. The method of claim 1, wherein the first porous glass body comprises a greater weight percentage of the doping constituent than the second porous glass body.

16. The method of claim 1 further comprising:

a core sintering step comprising sintering the porous preform to form a sintered preform;

a redraw step comprising redrawing the sintered preform into a core cane;

an outer cladding step comprising forming a porous outer cladding layer over the core cane; and a sintering step comprising sintering the porous outer cladding layer, resulting in an optical fiber preform.

17. The method of claim 1 further comprising:

an optical fiber draw step comprising drawing an optical fiber from an optical fiber preform made from the porous preform.

18. The method of claim 1, wherein the optical fiber exhibits an attenuation of electromagnetic radiation having a wavelength of 1310 nm of less than or equal to 0.324 dB/km as measured with an optical time-domain reflectometer; and the optical fiber exhibits an attenuation of electromagnetic radiation having a wavelength of 1550 nm of less than or equal 0.185 dB/km as measured with an optical time-domain reflectometer.

19. A method of manufacturing comprising:

a first vapor deposition step comprising vapor depositing a first porous glass body of a glass former and a doping constituent onto a substrate;

a cleaning step after the first vapor deposition step, the cleaning step comprising exposing the first porous glass body to a cleaning gas at a cleaning temperature for a cleaning period of time, the cleaning gas (i) removing a metal or metal oxide from the first porous glass body, (ii) changing an oxidation state of a metal or metal oxide within the first porous glass body, or (iii) a combination of (i) and (ii); and a second vapor deposition step after the cleaning step, the second vapor deposition step comprising vapor depositing a second porous glass body of the glass former onto the first porous glass body resulting in a porous preform for an optical fiber;

wherein the first vapor deposition step, the cleaning step, and the second vapor deposition step each occur in a different furnace.

* * * * *